Oct. 30, 1956 F. P. KEIPER, JR 2,769,135
CURRENT REGULATING SYSTEM
Filed Feb. 25, 1955
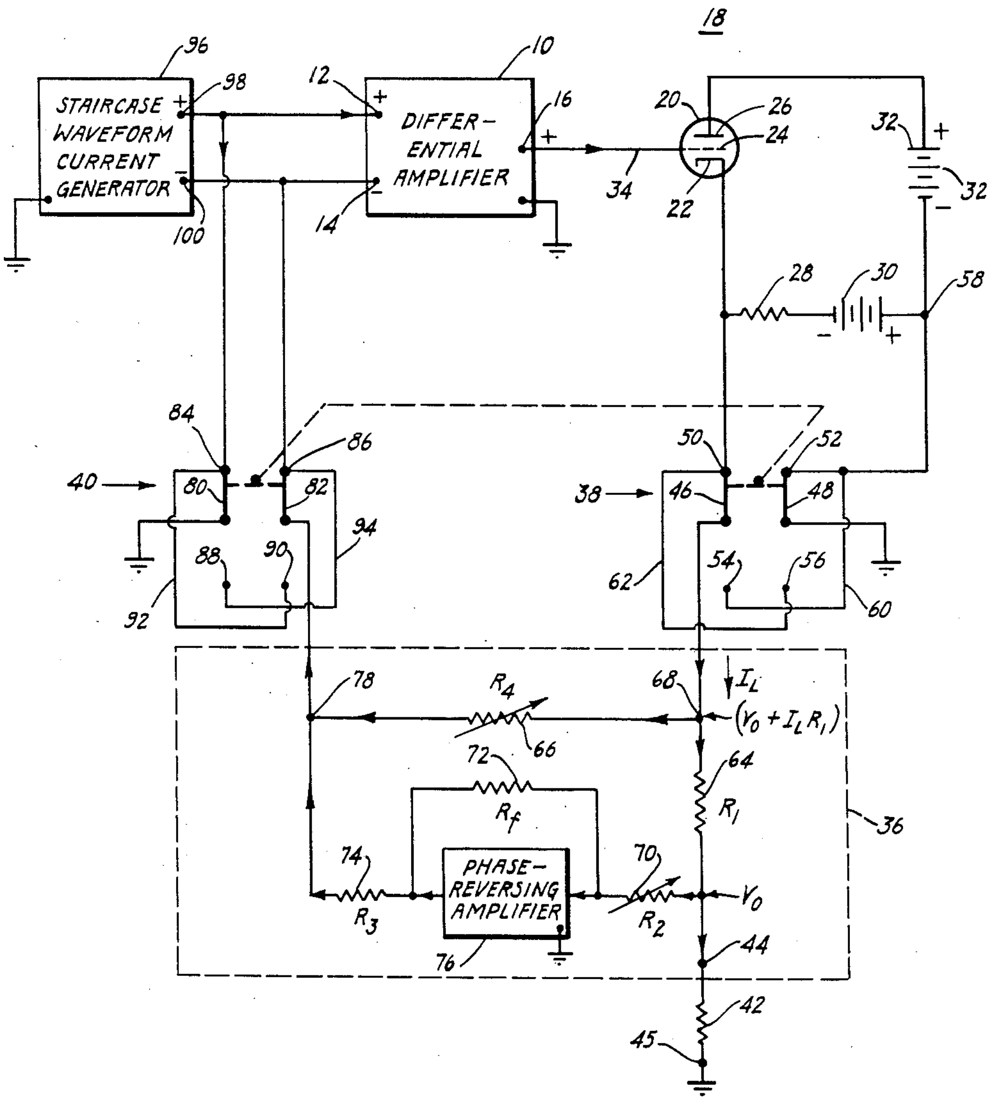
INVENTOR.
FRANCIS P. KEIPER, JR.
BY
Dean V. Hopkins
ATTORNEY United States Patent Office 2,769,135

Patented Oct. 30, 1956

2,769,135

CURRENT REGULATING SYSTEM

Francis P. Keiper, Jr., Elkins Park, Pa., assignor to Philco Corporation, Philadelphia, Pa., a corporation of Pennsylvania Application February 25, 1955, Serial No. 490,631

11 Claims. (Cl. 323—4)

This invention relates to electrical systems and more particularly, to improved direct-coupled current amplifiers.

Such amplifiers are especially useful in apparatus for determining the characteristics of transistors. For example, an important measurable characteristic of a transistor is the variation of the voltage drop $V_c$ between the collector and base electrodes of the transistor, produced in response to variations in the current $I_c$ supplied to the collector electrode, for a constant current $I_e$ supplied to the emitter electrode. In measuring this $V_c$–$I_c$ characteristic, it is obviously important to maintain the emitter current $I_e$ constant throughout the measurement. However, as is well-known in the art, the impedance between the emitter and base electrodes of a transistor varies substantially in response to variations in the current supplied to the collector electrode, as well as in response to variations in the intensity of the current supplied to the emitter electrode. Hence, in order to measure accurately the $V_c$–$I_c$ characteristic, it is necessary that the source which supplies current to the emitter electrode be capable of maintaining constant the emitter current despite wide variation in the input impedance of the emitter.

Moreover, inasmuch as the $V_c$–$I_c$ characteristic must be determined over a substantial range of values of emitter current, it is necessary that the source of emitter current be arranged to supply readily currents of different predetermined values.

In addition, the source of emitter current must be adapted readily to supply currents having either sense, to transistors having their base electrodes connected to a point at ground potential. (In the following discussion, the sense of current flow will be understood to be that of conventional positive current, i. e. opposite to the sense of the corresponding electron flow.) This requirement arises because there exist two general classes of transistors whose operating biases must be applied in respectively opposite polarities. More particularly, in deriving the aforementioned $V_c$–$I_c$ characteristics, it is essential that the voltage, developed between emitter and base in response to the constant current supplied to the emitter, be in a so-called forward-biasing polarity. With regard to p-n-p junction transistors and point-contact transistors utilizing an n-type semi-conductor, this means that the emitter current must be supplied in a sense such that it flows into the emitter, while for n-p-n junction transistors and point-contact transistors utilizing a p-type semi-conductor, the emitter current must be supplied in a sense such that it flows out of the emitter. For reasons of economy, it is clearly desirable that currents of either sense be available from the same current source.

Accordingly it is an object of the invention to provide an improved current amplifier.

Another object of the invention is to provide a current amplifier having great reliability and stability.

An additional object of the invention is to provide a current amplifier arranged to supply a constant predetermined current, in response to a control signal of constant magnitude supplied to the amplifier, to a load which may exhibit substantial impedance variations.

A further object of the invention is to provide a current amplifier arranged to reverse the sense of the output current at the flip of a switch, and in which substantially the same circuit components are utilized to supply currents of either sense.

A specific object of the invention is to provide a current amplifier particularly suited for use in a current source included in transistor testing apparatus.

According to the invention, the foregoing objects are achieved by a system which comprises a source of a control current whose intensity is subject to variations, and an amplifier supplied with this control current and responsive thereto to produce an auxiliary voltage having variations whose amplitude and sense are respectively determined by the variations in the intensity of the control current and by its sense. The system additionally comprises an output circuit which includes a pair of output terminals and a current metering impedance. One of these output terminals is connected to a point at reference potential, while the other of the output terminals is connected to one terminal of the current metering impedance.

The system also includes means which, when a load impedance of finite value is connected between the output terminals of the system, produce a flow of load current through this load impedance as well as through the current metering impedance. The current-producing means are constructed and arranged to be responsive to the application thereto of a varying control voltage to produce, in the aforementioned output circuit, a load current whose intensity varies in a sense determined by the sense of the aforesaid control voltage.

The system further comprises an arrangement coupled to the current metering impedance and responsive to the intensity of the output current flow therethrough to produce a feedback current undergoing variations in intensity corresponding to intensity variations in the load current and having a sense opposite to that of the aforesaid control current. This feedback current is supplied to the input of the aforesaid amplifier producing the auxiliary voltage, and the auxiliary voltage is supplied in turn to the load-current producing means as a control voltage.

The invention will be described in greater detail with reference to the appended drawing forming part of the specification, the single figure of which is a diagram of an amplifier system embodying the invention.

Referring to the drawing, it is seen that the current amplifier system according to the invention comprises a differential, direct-coupled amplifier 10 having first and second input terminals, designated 12 and 14 respectively, and an output terminal 16. The amplifier is constructed and arranged in a manner such that signals having positive-going variations and supplied to input terminal 12 produce positive-going variations in the output signal developed at terminal 16, while signals having negative-going variations and supplied to terminal 14 also produce positive-going variations in the output signal developed at terminal 16. Differential amplifiers capable of operating in this manner are well-known in the art and are described, for example, in the publication, "Vacuum Tube Amplifiers," edited by G. E. Valley, Jr., and Henry Wallman, and published by McGraw-Hill Book Company, Inc., New York, 1948, particularly in Section 11.10, beginning at page 441 thereof. The arrangements of Figures 11.25, 11.26 or 11.27, pages 442, 444 and 446 respectively of that book, are especially useful in this application. In the preferred embodiment of the invention, it is desirable that direct-coupled amplifier 10 have voltage gain much greater than unity, for example of the order of 500. This gain may be achieved in well-known manner by coupling additional D. C. amplifying stages to the output of the input differential amplifier. The design of such additional stages is discussed thoroughly in Chapter 11 of the above-identified publication and it is believed to be unnecessary to discuss this matter further herein.

The novel amplifier system additionally comprises a power amplifier stage 18 which includes an electron discharge tube 20 having a cathode 22, a control grid 24 and an anode 26. A resistor 28 connects, to cathode 22, the negative pole of a source of biasing voltage 30, the positive pole of which is connected to the negative pole of an anode supply source 32. The positive pole of source 32 is connected directly to the anode 26 of tube 20. In addition, grid 24 of tube 20 is connected directly to the output terminal 16 of differential amplifier 10 by a lead 34.

The system also comprises a feedback circuit 36 which is coupled to power amplifier 18 by means of a double-pole, double-throw switch 38, and is also coupled alternatively to input 12 or to input 14 of differential amplifier 10 by means of a double-pole, double-throw switch 40, ganged mechanically to switch 38. In addition, feedback circuit 36 is connected to a load 42 at an output terminal 44. The other terminal of load 42 is connected to a second output terminal 45 which is in turn connected to a point at ground potential.

More specifically, double-pole, double-throw switch 38 comprises switch blades 46 and 48, a first pair of fixed contacts 50 and 52, and a second pair of fixed contacts 54 and 56. These fixed contacts are arranged so that blades 46 and 48 can be closed simultaneously either to contacts 50 and 52 respectively or to contacts 54 and 56 respectively. Contact 50 of switch 38 is connected to cathode 22 of tube 20 while contact 52 is connected to the junction 58 between the positive pole of source 30 and the negative pole of source 32. In addition contact 50 is also connected by a lead 62 to contact 56 while contact 52 is connected to contact 54 by a lead 60. Blade 48 is connected to a point at ground potential, while blade 46 is connected to output terminal 44 through a metering resistor 64. Resistor 64 forms a part of the feedback circuit 36 and serves to measure the current flowing through the load 42 in a manner described in greater detail hereinafter.

Feedback circuit 36 comprises two branches in addition to metering resistor 64—namely, a first branch comprising a resistor 66 having one terminal connected to the junction 68 of switch blade 46 and resistor 64, and a second branch comprising resistors 70, 72 and 74 respectively and a phase-reversing direct-coupled amplifier 76. One terminal of resistor 70 is connected to output terminal 44, while the other terminal of resistor 70 is connected to the input of phase-reversing amplifier 76. The output of amplifier 76 is connected to one terminal of resistor 74, the other terminal of which is connected to the free terminal of resistor 66 at a junction 78. Resistor 72, serving as a feedback path for amplifier 76 connects the output of this amplifier to its input.

In the preferred embodiment of the invention shown in the drawing, resistors 66 and 70 are variable resistors permitting a more ready adjustment of these resistors to critical values $R_4$ and $R_2$ respectively, as described hereinafter. Moreover the values of resistors 66 and 70 are each chosen to be much greater than that of metering resistor 64, e. g. of the order of 100 to 1 greater.

With regard to phase-reversing amplifier 76, it will be noted that the combination of this amplifier with resistors 70 and 72, as described above, constitutes the well-known "see-saw" circuit which is discussed in considerable detail in the book, "Waveforms," edited by B. Chance, V. Hughes, E. F. MacNichol, D. Sayre and F. C. Williams, and published by McGraw-Hill Book Co., New York, 1949, at pages 27 through 31, Section 2.5 thereof. As pointed out in this book, when amplifier 76 has a high gain, the gain of the "see-saw" circuit becomes substantially independent of the gain of the amplifier 76 and is dependent substantially only on the values of the passive elements associated therewith, i. e. resistors 70 and 72. In the present embodiment, the system has been found to work well when amplifier 76 has a voltage gain of the order of 100. A specific circuit arrangement suitable for use in the present novel system is shown at page 30, Figure 2.12(a) of the above-cited book, "Waveforms." In this "see-saw" circuit, when no signal is supplied to the input of the amplifier, no voltage appears at its output despite the fact that the amplifier 76 is a direct-coupled amplifier. When the input signal is varied in either sense, i. e. either positively or negatively with respect to a point at ground potential, the output signal undergoes variations in the opposite sense that is, the amplifier produces a negatively poled output signal in response to a positively poled input signal and vice-versa. Inasmuch as the "see-saw" circuit is thoroughly discussed in the publication, "Waveforms," it is not believed necessary to discuss it further at this point.

As aforementioned, feedback network 36 is connected selectively to one or the other of the input terminals of differential amplifier 10 by switch 40. This switch comprises first and second blades designated 80 and 82 respectively, a first pair of fixed contacts designated 84 and 86 respectively, and a second pair of fixed contacts designated 88 and 90 respectively. Switch 40 is constructed in a manner such that blade 80 closes to contact 84 when blade 82 closes to contact 86, while blade 80 closes to contact 88 when blade 82 closes to contact 90. Moreover, as aforementioned, switch 40 is mechanically ganged to switch 38. This ganging is arranged so that when blades 80 and 82 of switch 40 are respectively closed to contacts 84 and 86, blades 46 and 48 of switch 38 are respectively closed to contacts 50 and 52, and when blades 80 and 82 of switch 40 are respectively closed to contacts 88 and 90, blades 46 and 48 of switch 38 are closed respectively to contacts 54 and 56.

As shown in the drawing, contact 84 of switch 40 is connected to input terminal 12 of differential amplifier 10, while contact 86 of the switch is connected to input terminal 14 of the amplifier. Blade 80 of the switch is connected to a point at ground potential while blade 82 is connected to junction 78 of the feedback circuit 36. In addition, contact 84 is connected to contact 90 by a lead 92, while contact 86 is connected to a terminal 88 by a lead 94.

Lastly, the system comprises a source of current 96 having a first output terminal 98 which supplies a current having a positive sense, and a second output terminal 100, which supplies a current having a negative sense. Terminal 98 is directly connected to the input terminal 12 of amplifier 10, while terminal 100 is directly connected to input terminal 14 of this amplifier. As aforementioned, this system is especially adapted for use in transistor testing apparatus as a current supply for the emitter of the transistor under test. In such apparatus it is desirable that a sequence of different discrete current values (i. e. a "staircase" waveform) be supplied to the emitter of the transistor, each current value being of duration sufficiently long to permit auxiliary equipment (not shown) to vary the intensity of the collector current through the operating range of the transistor, thereby to obtain a family of curves of collector voltage as a function of collector current for various constant values of emitter current. Accordingly, in the preferred embodiment of the invention, current generator 96 is designated as a staircase waveform current generator. Various methods for generating the staircase waveform are known to the art, one such method being shown in the above-identified publication, "Waveforms" at page 294, Figure 8.6(a), and it is believed that no further discussion of the structure of generator 96 is necessary at this point. It will be well understood, however, that in other applications of the novel amplifying system, generator 96 need not be a staircase waveform generator, inasmuch as the amplifier system will faithfully reproduce, in load 42, current variations according to an input signal having any arbitrary waveshape.

In operation, when switches 38 and 40 are closed as shown in the drawing, i. e. switch blades 46 and 48 are closed respectively to contacts 50 and 52, and switch blades 80 and 82 are closed respectively to contacts 84 and 86, the system supplies to the load 42 a current having a positive sense and a value determined precisely by the value of the control signal supplied to terminal 14 by generator 96, irrespective of the impedance of, or variations in the impedance of, load 42. Alternatively, when the blades of switches 38 and 40 are closed to the other contacts thereof, the system supplied to load 42 a current having a negative sense and a value determined precisely by the value of the control signal supplied by generator 96 to the input terminal 12 of differential amplifier 10.

More particularly, when the blades of switches 38 and 40 are closed in the manner indicated in the drawing, input terminal 12 is connected to a point at ground potential while input terminal 14 is connected to output terminal 100 of generator 96, being supplied thereby with a current having a negative sense. Initially the system is adjusted in a manner such that, when no input signal is supplied either to terminal 12 or terminal 14 of amplifier 10, no current $I_L$ flows into the metering resistor 64 or the load 42, and the voltage $V_0$ at terminal 44 is accordingly zero. This adjustment involves establishing the D. C. bias on the grid of tube 24 at a value such that the static anode-cathode resistance of tube 20 has a value substantially equal to the ratio of the voltage of source 32 to the voltage of source 30, multiplied by the ohmic value of resistor 28. The D. C. bias of grid 24 may be adjusted in any one of many well-known manners, e. g. by adjusting the D. C. output level of the output stage of amplifier 10, which output stage supplies terminal 16.

When, an aforementioned, a negative-going signal is supplied to terminal 14 of amplifier 10, the potential applied by amplifier 10 to the grid 24 of tube 20 rises, causing the cathode current of tube 20 to rise in turn. By reason of the positioning of the switches, the load 42, and the metering resistor 64 is connected in series-relationship therewith, are connected to cathode 22, and, as the cathode current increases, a positive current of increasing value flows through the metering resistor 64 and the load 42.

Normally, however, this positive current will have a value dependent upon the impedance of the load 42, and, in many instances, as discussed hereinbefore, the impedance of this load will vary substantially in response to variations in the voltage developed across it or even, as in the case of a transistor, in response to voltages applied to other electrodes of the circuit or circuit element which includes the load. In certain applications, such as, for example, the testing of transistors it is essential that the current through the load be maintained substantially at a predetermined value, as established by the value of the control signal supplied to the amplifier, despite wide variations in the load impedance. This result is achieved in my novel system by feeding back to the input 14 of the differential amplifier 10, a current having a value proportional to the current flowing through load 42. This feedback current is derived in a manner such as to have sense opposite to that of the control current supplied to terminal 14, i. e. it is of positive polarity. Since differential amplifier 10 has a high gain, any small signal supplied to terminal 14 will tend to produce a much larger signal at grid 24 of tube 20. Hence the system will tend strongly to feed back to terminal 14 a current having an intensity substantially equal to the intensity of the conrol current supplied by generator 96, so that a resultant signal having only a very small net amplitude is supplied to terminal 14. Because the system tends to equilibrium at a value of feedback current equal to that of the control current, and because this feedback current, derived in a manner now to be described, has a value directly proportional to the load current, it is clear that the system will tend strongly to maintain the load current at a value which is substantially proportional to the value of the control current, despite large variations in the load impedance.

More particularly, a feedback current proportional to the load current is produced by feedback circuit 36 and is supplied via switch blade 82 and contact 86 to input terminal 14 of amplifier 10. In feedback circuit 36, because resistors 66 and 70 have values many times greater than that of metering resistor 64, the branches respectively containing resistors 66 and 70 draw currents which are negligible compared to that flowing through metering resistor 64; hence the current flowing through resistor 64 is substantially equal to that flowing through the load 42. Since resistor 64 is chosen to have substantially ohmic properties, i. e. a resistance substantially independent of the voltage applied across its terminals, the voltage drop produced across the terminals of resistor 64 is an accurate measure of the current passing through the load 42.

When a load current having a value $I_L$ flows through metering resistor 64 and load impedance 42, there is developed at terminal 44 a voltage having the value $V_0$, and at junction 68 a voltage having the value $(V_0+I_LR_1)$. Because, as described above, the potential at terminal 14 always tends strongly toward zero, junction 78 sees substantially a short-circuit as it looks into terminal 14. As a result, the current flowing into junction 78 through resistor 66 is equal substantially to $(V_0+I_LR_1)/R_4$. Moreover since the gain of the amplifying network, consisting of phase-reversing amplifier 76, resistor 70 and resistor 72, is equal substantially to $(-Rf/R_2)$ (see the above-identified publication "Waveforms," page 27, equation 12), the current flowing into junction 78 through resistor 74 has a value substantially equal to $(V_0)(-R_f/R_2)/R_3$. From these current relationships, it follows that, when the product of $R_2$ and $R_3$ is substantially equal to the product of $R_4$ and $R_f$, the net current supplied to junction 78, and hence to terminal 14 of differential amplifier 10, has a value substantially equal to $+I_L(R_1/R_4)$, i. e. it is substantially proportional to the load current and in a sense opposite to that of the control current. Since the feedback current, under equilibrium conditions, is substantially equal in intensity to the control current flowing from terminal 100 of generator 96, it is seen that the current gain through the system is substantially equal to $R_4/R_1$. Thus, in the system shown, the gain can be varied by varying the value $R_4$, while simultaneously adjusting $R_2$ to maintain substantially the aforementioned relationship, $R_2R_3=R_4R_f$. Moreover, it is clear that the current $I_L$ flowing into the load 42 is substantially independent of the value of the load impedance.

As an important feature of the invention, the amplifier system is arranged to supply a negative current to load 42, without the use of any additional components, which current also is maintainable at an exact value as established by an input control current, despite wide variations in the impedance of load 42. To achieve this result, it is necessary to close the blades of double-pole double-throw switches 38 and 40 to the sets of contacts opposite to those to which the blades are shown closed in the drawing. That is, it is only necessary to close blades 46 and 48 respectively to contacts 54 and 56 and blades 80 and 82 respectively to contacts 88 and 90. When these switching operations are performed, the following changes are effected in the circuit:

Terminals 98 and 12 respectively of generator 96 and amplifier 10 are disconnected from the point at ground potential, while terminals 100 and 14 respectively of the generator and amplifier are connected to the point at ground potential. As a result, amplifier 10 is supplied with control currents having a positive sense, and in response to positive-going variations in the intensity of the control current supplied to input 12, this amplifier produces an output voltage also having positive-going variations.

In addition, in power amplifier 18, the cathode 22 of tube 20 is disconnected from junction 68 supplying the metering resistor 64 and the load impedance 42, and is connected to a point at ground potential. Moreover, junction 58, interconnecting the bias source 30 and the anode supply source 32, is disconnected from the point at ground potential and is connected to junction 68.

As a result of these changes in the circuit of power amplifier 18, when grid 24 of tube 20 is driven to increasingly positive potentials by amplifier 10, an increasingly negative load current $I_L$ flows through the metering resistor 64 and the load 42.

However, it is a feature of the system that, in spite of these circuit changes, it is unnecessary to alter the value of the voltage which must be applied to grid 24 of tube 20 in order to zero the circuit, i. e. in order that the intensity of the current in load 42 shall fall to zero in the absence of a control current at input terminal 12. More particularly, it will be recalled that to achieve this result when switches 38 and 40 are closed to the positions shown in the drawing, it is necessary to apply to grid 24 a D. C. biasing voltage having a value such that the static cathode-anode resistance of tube 20 is substantially equal to the product of the value of resistance 28 and the ratio of the voltage of source 32 to that of source 30. Precisely the same biasing voltage is required to zero the circuit in the present instance. Accordingly, there is no need to readjust the system each time that the switches 38 and 40 are thrown from one set of fixed contacts to the other.

The operation of the system, when the switches 38 and 40 are in the positions opposite to those shown in the drawing, is generally similar to that described above for the switches positioned as shown in the drawing. Briefly, when a positive-going control current is supplied to input 12 of differential amplifier 10, the output voltage at terminal 16, and hence the voltage supplied to grid 24, tends to rise in response to the control current. As the voltage on grid 24 rises, an increasingly heavy anode current is drawn by tube 20 through load 42 and metering resistor 64 in series with the anode, and, as a result, increasingly large negative potential are developed at terminals 44 and junction 68. Feedback network 36 then develops, as aforedescribed, a negative current having a value substantially equal to $(-I_L)\ (R_1/R_4)$, and this current is fed back via switch blade 82, conductor 92 and contact 84 to terminal 12 of differential amplifier 10. Because of the high gain amplifier 10, the system establishes itself in an equilibrium condition such that the sum of the positive control current supplied by generator 96 and the negative feedback current supplied by feedback network 36 approaches zero. That is, the system adjusts itself to produce a feedback current whose magnitude is substantially equal to that of the control current. Since the value of the feedback current is proportional to the value of the current flowing through the load 42, the value of the load current is in turn proportional to that of the control current supplied to the system by generator 96. Again, since the feedback current depends only on the voltage drop across metering resistor 64, and is independent of the voltage drop across load 42, the current through the metering resistor and the load is maintained at a value dependent only on the value of the control current and independent of substantial variation in the impedance of the load 42.

Thus, I have described a novel current amplifying system readily adapted to supply a current of either sense and of predetermined constant intensity to a load whose impedance may vary in an arbitrary manner over a wide range of values. My system is especially useful in transistor testing apparatus as a source of constant current of either sense for the emitter of a transistor having its base connected to a point at ground potential, having a varying current supplied to its collector and having means for measuring the corresponding collector currents and voltage of the transistor, thereby to determine its Vc—Ic characteristics. However, it will be well understand that my novel system may be used in a variety of other applications such as will occur to those skilled in art. Therefore, while I have described my invention by means of specific examples and a specific embodiment, I do not wish to be limited thereto, for obvious modifications will occur to those skilled in the art without departing from the spirit and scope of the invention.

What I claim is:

1. In combination: a source of a control current whose intensity is subject to variations; means supplied with said control current and responsive thereto to produce an auxiliary voltage having variations whose amplitude and sense are respectively determined by the amplitude and sense of said variations in the intensity of said control current; an output circuit including a pair of output terminals and a current-metering impedance, one of said output terminals being connected to a point at reference potential and the other of said output terminals being connected to one terminal of said current-metering impedance; means for producing a current through a load and said current-metering impedance when said load is connected between said output terminals, said last-named means being responsive to the application of a varying control voltage to produce in said output circuit a load current whose intensity varies in a sense determined by the sense of said control voltage variations; a network comprising amplifying means having a voltage gain much greater than unity and responsive to variations in the amplitude of a signal supplied to an input terminal thereof to produce, at an output terminal thereof, a signal having amplitude variations as determined by said amplitude variations of said input signal and in a sense opposite to that of said latter variations, first resistance means connecting said input terminal of said amplifying means to said one terminal of said current-metering impedance, second and third resistance means connected in series relationship, means connecting the free terminal of said second resistance means to said output terminal of said amplifying means and connecting the free terminal of said third resistance means to the other terminal of said current-metering impedance, fourth resistance means having one terminal thereof connected to said input terminal of said amplifying means and the other terminal thereof connected to said output terminal of said amplifying means, and means connecting the interconnection of said second and third resistance means to the input of said auxiliary voltage-producing means; and means for applying said auxiliary voltage to said load current-producing means as a control voltage.

2. A combination according to claim 1, wherein said current-metering impedance consists of fifth resistance means, wherein said first and third resistance means each have an ohmic value which is much greater than the ohmic value of said fifth resistance means, and wherein the values of said first, second, third and fourth resistance means are related to one another in a manner such that the product of the value of said first resistance means and the value of said second resistance means is substantially equal to the product of the value of said third resistance means and the value of said fourth resistance means.

3. In combination, a source of a control current whose intensity is subject to variations, a direct-coupled amplifier supplied with said control current, having a voltage gain much greater than unity and arranged to produce in response to said variations in the intensity of said control current a control voltage having amplitude variations in a sense opposite to that of said intensity variations, an electron discharge tube having a cathode, a control electrode and an anode, a source of a voltage negative with respect to a point at reference potential, first resistance means connecting said negative voltage source to said cathode, means connecting said control electrode to the output of said amplifier, a source of a voltage positive with respect to a point at reference potential, means connecting said positive voltage source to said anode, a current metering resistor having one terminal connected to said cathode of said electron discharge tube, a pair of output terminals, one of said output terminals being connected to the other terminal of said metering resistor and the other of said output terminals being connected to a point at reference potential, means shunted across said metering resistor and constructed to produce a current having an intensity dependent upon the intensity of a current flowing through said metering resistor and a sense opposite to that of said control current, and means connecting the output of said last-named means to the input of said direct-coupled amplifier.

4. A combination according to claim 3, wherein said direct-coupled amplifier comprises means for supplying to said control electrode of said electron discharge tube a biasing voltage having a value such that the static anode-cathode resistance of said tube has a value substantially equal to the ohmic value of said first resistance means multiplied by the ratio of the value of said positive voltage to the value of said negative voltage.

5. A combination according to claim 3, wherein said current-producing means shunted across said metering resistor comprises an amplifying means having a voltage gain much greater than unity, said amplifying means being responsive to variations in the amplitude of an input signal to produce an output signal having amplitude variations as determined by the amplitude variations of said input signal and a sense opposite to the sense of said latter variations, second resistance means coupling the input of said amplifying means to said other terminal of said current metering resistor, third and fourth resistance means connected in series relationship, means connecting the free terminal of said third resistance means to the output of said amplifying means and connecting the free terminal of said fourth resistance means to said one terminal of said current-metering resistor, fifth resistance means having one terminal thereof connected to said input of said amplifying means and the other terminal thereof connected to said output of said amplifying means, and means connecting the interconnection of said third and fourth resistance means to the input of said direct-coupled amplifier.

6. A combination according to claim 5, wherein said second and fourth resistance means each have an ohmic value which is much greater than the ohmic value of said current metering resistor, and wherein the values of said second, third, fourth and fifth resistance means are related one to the other in a manner such that the product of the value of said second resistance means and the value of said third resistance means is substantially equal to the product of the value of said fourth resistance means and the value of said fifth resistance means.

7. In combination, a source of a control current whose intensity is subject to variations, a direct-coupled amplifier having a voltage gain much greater than unity and supplied with said control current, said amplifier producing, in response to variations in the intensity of said control current, a control voltage whose amplitude variations are in the same sense as said intensity variations of said control current, an electron discharge tube having a cathode, a control electrode and an anode, means connecting said cathode to a point at reference potential, means connecting said control electrode to the output of said amplifier, a first source of voltage, first resistance means connecting the negative pole of said first source to a point at reference potential, a second source of voltage, means connecting the negative pole of said second source to the positive pole of said first source, means connecting the positive pole of said second source to said anode of said electron discharge tube, a pair of output terminals, one of said terminals being connected to a point at reference potential, a current-metering resistor interconnecting the other of said terminals and the negative pole of said second source, means shunted across said metering resistor and constructed to produce a feedback current whose intensity is determined by said current through said metering resistor and whose sense is opposite to that of said control current and means connecting the output of said last-named means to the input of said direct-coupled amplifier.

8. A combination according to claim 7, wherein said direct-coupled amplifier comprises means for supplying to said control electrode of said electron discharge tube a biasing voltage having a value such that the static anode-cathode resistance of said tube has a value substantially equal to the ohmic value of said first resistance means multiplied by the ratio of the value of said voltage of said second source to the value of said voltage of said first source.

9. A combination according to claim 7, wherein said current-producing means shunted across said metering resistor comprises an amplifying means having a voltage gain much greater than unity, said amplifying means being responsive to variations in the amplitude of an input signal to produce an output signal having amplitude variations as determined by said amplitude variations of said input signal and in a sense opposite to the sense of said latter variations, second resistance means coupling the input of said amplifying means to that terminal of said current metering resistor which is connected to said other output terminal, third and fourth resistance means connected in series relationship, means connecting the free terminal of said third resistance means to the output of said amplifying means and connecting the free terminal of said fourth resistance means to the other terminal of said metering resistor, fifth resistance means having one terminal thereof connected to said input of said amplifying means and the other terminal thereof connected to said output of said amplifying means, and means connecting the interconnection of said third and fourth resistance means to the input of said direct-coupled amplifier.

10. A combination according to claim 9, wherein said second and fourth resistance means each have an ohmic value which is much greater than the ohmic value of said current-metering resistor, and wherein the values of said second, third, fourth and fifth resistance means are related one to the other in a manner such that the product of the value of said second resistance means and the value of said third resistance means is substantially equal to the product of the value of said fourth resistance means and the value of said fifth resistance means.

11. In combination, a direct-coupled differential amplifier comprising a first input terminal and an output terminal and responsive to a first input signal having amplitude variations of a given magnitude and in a given sense and applied to said first input terminal to produce at said output terminal a first signal having amplitude variations of a magnitude much greater than said given magnitude and in said given sense, said amplifier additionally comprising a second input terminal and being responsive to a second input signal having amplitude variations of a predetermined magnitude and in a sense opposite to said given sense applied to said second input terminal to produce at said output terminal a second signal having amplitude variations of a magnitude much greater than said predetermined magnitude and in said given sense, an electron discharge tube having a cathode, a control electrode and an anode, a first source of voltage, first resistance means for connecting the negative pole of said source to said cathode, a second source of voltage, means connecting the negative pole of said second source to the positive pole of said first source and the positive pole of said second source to said anode of said electron discharge tube, a feedback circuit comprising a current-metering resistor, amplifying means responsive to an input signal having amplitude variations in a predetermined sense to produce an output signal having a magnitude much greater than the magnitude of said latter amplitude variations and in a sense opposite to said predetermined sense, second resistance means connecting the input of said amplifying means to one terminal of said metering resistor, third and fourth resistance means connected in series relationship, the free terminal of said third resistance means being connected to the output of said amplifying means and the free terminal of said fourth resistance means being connected to the other terminal of said metering resistor, a pair of output terminals, one terminal of said pair being connected to a point at reference potential and the other terminal of said pair being connected to said one terminal of said current-metering resistor, switching means comprising first and second double-pole double-throw switches, said first switch comprising first and second switch blades and first, second, third and fourth fixed contacts, said first and second switch blades being arranged to be closable simultaneously either to said first and second fixed contacts respectively or to said third and fourth fixed contacts respectively, said second switch comprising third and fourth switch blades and fifth, sixth, seventh and eighth fixed contacts, said third and fourth switch blades being arranged to be closable simultaneously either to said fifth and sixth fixed contacts respectively or to said seventh and eighth fixed contacts respectively, means mechanically ganging said first, second, third and fourth switch blades in a manner such that closure of said first and second switch blades respectively to said first and second fixed contacts effects closure of said third and fourth switch blades respectively to said fifth and sixth fixed contacts while closure of said first and second switch blades respectively to said third and fourth fixed contacts effects closure of said third and fourth switch blades respectively to said seventh and eighth fixed contacts, means connecting said first fixed contact to said fourth fixed contact, said second fixed contact to said third fixed contact, said fifth fixed contact to said eighth fixed contact and said sixth fixed contact to said seventh fixed contact, means connecting said cathode of said electron discharge tube to said first fixed contact, means connecting the interconnection of said first and second sources to said second fixed contact, means connecting said first switch blade to said other terminal of said current-metering resistor, means connecting said second switch blade to a point at reference potential, means connecting said fifth contact to said first input terminal of said first input terminal of said differential amplifier, means connecting said sixth fixed contact to said second input terminal of said differential amplifier, means connecting said third switch blade to a point at reference potential, and means connecting said fourth switch blade to the interconnection of said third and fourth resistance means.

References Cited in the file of this patent

UNITED STATES PATENTS 2,197,934 Koch ------------------ Apr. 23, 1940